United States Patent [19]
Ichiki et al.

[11] 3,816,276
[45] June 11, 1974

[54] METHOD FOR THE TREATMENT OF WATER

[75] Inventors: Minoru Ichiki; Kazuhiko Nakade, both of Tokyo, Japan

[73] Assignee: Mitsui Mining & Smelting Co., Ltd., Tokyo, Japan

[22] Filed: Mar. 16, 1973

[21] Appl. No.: 342,210

[30] Foreign Application Priority Data
Mar. 22, 1972  Japan.............................. 47-28674

[52] U.S. Cl................... 204/152, 204/149, 210/44, 210/51
[51] Int. Cl.......................... B01k 1/82, C02c 5/12
[58] Field of Search ......... 204/149, 152; 210/44, 51

[56] References Cited
UNITED STATES PATENTS

| | | | |
|---|---|---|---|
| 535,802 | 3/1895 | Lugo................................... | 204/152 |
| 3,035,992 | 5/1962 | Hougen.............................. | 204/149 |
| 3,347,786 | 10/1967 | Baer et al. ........................... | 210/45 |
| 3,505,188 | 4/1970 | Pan..................................... | 204/149 |
| 3,523,891 | 8/1970 | Mehl................................. | 204/149 X |
| 3,764,500 | 10/1973 | Gibson, Jr. et al. ............. | 204/149 X |

*Primary Examiner*—John H. Mack
*Assistant Examiner*—A. C. Prescott
*Attorney, Agent, or Firm*—Woodhams, Blanchard & Flynn

[57] ABSTRACT

Method for treating such water which contains metal ions, oils or suspended solids through a series of processes: the first process in which water containing metal ions, oils or suspended solids is electrolyzed in the first electrolytic cell provided with an anode made of aluminum or aluminum alloy while blowing air into said water, so that said metal ions, oils or suspended solids are changed to compounds insoluble in water; then, the second process in which anionic water-soluble high molecular materials are added to the water obtained from said first process, so that said compounds are converted into coagulums which by their structures are apt to ascend to and float on the water surface; and finally the third process in which the water obtained from the second process is electrolyzed in the second electrolytic cell provided with an insoluble anode, so that all said coagulums are substantially caused to ascend to and float on the water surface so as to be separated from the water, thus obtaining harmless and clean water.

4 Claims, No Drawings

3,816,276

METHOD FOR THE TREATMENT OF WATER

BACKGROUND OF THE INVENTION a. Field of the Invention:

This invention relates to a method for obtaining harmless and clean water by separating and eliminating such metal ions, oils or suspended solids which are contained in the water.

b. Description of the Prior Art:

Industrial waste water usually contains metal ions, oils or suspended solids, and elimination of them is required before draining the water. It has been general practice that chemical compounds such as neutralizing agents or coagulating agents are added to such water first to change the ions of metals, oils or suspended solids into water-insoluble compounds, then said water-insoluble compounds are separated from water by sedimentation based on the difference of their specific gravity from that of water. However, the problem is in the fact that many kinds of industrial waste water cannot be readily treated to a satisfactory extent by such an addition of chemical compounds alone to obtain harmless and clean water, because some of harmful contents cannot be changed into water-insoluble compounds by such addition, or because some of water-insoluble compounds may be low in sedimentation rate. Furthermore, the added chemical compounds themselves may be sometimes harmful by their properties and may have a possibility to remain in water. The addition of chemical compounds, even if harmless, is considered as unsatisfactory when the compounds sometimes form a great amount of residue, the disposal of which gives rise to another problem yet to be solved. It is to be noted, moreover, that the water-insoluble suspended solids generated by the addition of the chemical compounds must be separated from water by sedimentation-separation method or the like. For this purpose a large sedimentation-separation tank is usually employed. This method, which is effective when the specific gravity of materials to be eliminated are substantially higher than that of water, is less effective for substances of almost equal specific gravity to that of water or for substances of high dispersibility, because these substances are liable to be drained as they are contained in the water. One method for overcoming the above-mentioned demerits in waste water treatment has been disclosed, which is featured by a simultaneous accomplishment of converting the contents into water-insoluble compounds and separating the thus generated insoluble compounds from water by an electrolysis process provided with an soluble anode. This method has shown excellent performance in removing cadmium ion or emulsified oil from water containing it. However, even this method may have difficulty in achieving high efficiency of separating insoluble compounds from water, when a great volume of water solution is treated by water electrolysis equipment of a limited capacity, due to water convection caused by a great amount of gas being generated.

SUMMARY OF THE INVENTION

It is an object of the present invention to provide a method which can solve the above-mentioned problems to thereby make a great deal of waste water harmless and clean, as a result of analysing and then organizing the removal mechanism of the contents from the water by electrolysis. This method comprises three serial processes: in the first process, water containing metals, oils, suspended solids and other contents is electrolyzed in the first electrolytic cell provided with an anode of aluminum or aluminum alloys while air is blown into said water, so that said contents are changed into compounds insoluble in water, and at the same time said compounds are caused to fully absorb and retain foams of air, or hydrogen gas or oxygen gas generated by the electrolysis so as to bring the specific gravity of said compounds to an extremely low level; in the second process, anionic water-soluble high molecular materials are added to the water obtained from the first process so that said compounds are converted into coagulums which by their structures are apt to ascend and float on the water surface; and finally in the third process, the water obtained from the second process is electrolyzed in the second electrolytic cell provided with an insoluble anode, so that all said coagulums are substantially caused to ascend to and float on the water surface, thus obtaining such water solution which scarcely contains harmful contents below said floated coagulums. This invention is featured by the separation of two functions: the function to change the dissolved or suspended contents into water-insoluble compounds which can be separated from water; and the function to separate the water-insoluble compounds from the water to obtain clean water, with a result to allow both of the functions to be performed to the best extent so that even a great quantity of waste water can be treated effectively. The first function of changing the contents into water-insoluble matter is performed by the action of aluminum hydroxide generated by electrolysis which is conducted using an anode of aluminum or aluminum alloys, and therefore, its capability can be increased proportionately by increasing the electric current passed. Furthermore, the electrolyte is agitated so that reaction may be accelerated, making it unnecessary to give consideration to the convection of the electrolyte which is caused by gases being generated by electrolysis, and the agitation and resultant dispersion of the gas perform a highly effective role in the subsequent separation. Solids, having been made water-insoluble, are further made very liable to float on a water surface, because the solids fully absorb fine foams of the gases generated during the electrolysis, and those of the air blown in, so as to lower the inherent specific gravity to an extremely low level. The conditions for the electrolysis in the first process normally are: 0° to 50°C; and from 50 to 1,000 A per 1,000 litre of waste water, although varying with the kinds and amount of contents in the waste water. The volume of air which is blown in is as much as agitating the electrolyte, for example, from 10 to 300 litre/min. per 1,000 litre of waste water. The anode is made of aluminum or aluminum alloy made of aluminium and one or two of indium and gallium, made of said aluminium alloy and one or two of sodium and lithium, or magnesium and calcium, or made of said aluminium alloy and zinc or tin. The cathode is made of iron, stainless steel, nickel, carbon, copper, or the like.

The second function, the separation of the water-insoluble compounds from the water, is performed by an action to increase their floatability which is effected by adding some anionic water-soluble high molecular materials such as sodium polyacrylic acid, polyacrylamide or sodium alginate with coagulating effects, so that the water-insoluble compounds are caused to combine each other to form coagulums. The amount of these anionic water-soluble high molecular materials to be added is normally from 1 to 30 g per 1,000 litre of water, although varying with the kinds and amount of the existing water-insoluble compounds.

In the second electrolytic cell in the subsequent process, the action of hydrogen and oxygen gases plays the leading role for the process. These gases are generated by using insoluble anodes. Almost all coagulums completely ascend to the water surface along with the ascending gas foams and float there. This floating can be ensured so far as the electrolytic current is kept under proper control in order that these gases may vertically ascend without being disturbed. The anode for the second electrolytic cell is made of such materials as graphite, magnetic iron oxide, or silicon-containing cast iron. The cathode can be made of the same materials as those used for that of the first electrolytic cell. The conditions for the electrolysis are the same with those for the first cell: in general, at room temperature (15° – 35°C); and from 10 to 100 A per 1,000 litre of waste water, the amperage varying with the kinds and amounts of contents in the waste water.

This invention makes it possible by the series of processes noted heretofore to highly increase capability to remove cadmium ion or emulsified oil from waste water which contains such materials. Employment of the whole or part of this invention can accomplish far superior effects in such removal as compared with the use of sedimentation-separation tank conventionally adopted for separating solution from the solid compounds of heavy metals, which have been changed to water-insoluble matter as a result of adding some kinds of chemicals.

The details of the method of the invention are described by its embodiment.

DESCRIPTION OF THE PREFERRED EMBODIMENT

Example

Electrolysis was conducted with an electrolyte of industrial waste water (pH = 7.5) containing 22.4 ppm cadmium (including 15.7 ppm in the dissolved state), 14.2 ppm lead (including 0.0 ppm in the dissolved state), and 150 ppm emulsified oil; an anode of an aluminum alloy containing 5 percent zinc; a cathode of iron. The electrolysis was lasted for 150 minutes during which 133A direct current was passed per 1,000 litre of said electrolyte, and air was blown in at a rate of 200 litre/min. per 1,000 litre of said electrolyte. As a result, generation of water-insoluble compounds was observed in the electrolyte. To this suspension, sodium polyacrylic acid was added at a ratio of 10 g to 1,000 litre of the suspension, and after mixing and dissolving, the water-insoluble compounds became agglomerated to form coagulums of smaller bulk specific gravity. Then another electrolysis was conducted, using said suspension containing said agglomerated coagulums as an electrolyte, graphite as an anode, and iron as a cathode, and applying D.C. current of 50 A per 1,000 litre of the electrolyte. After 10 minutes' electrolysis, almost all the coagulums ascended to the water surface to float there, leaving the solution under them clean. Analysis of this clean solution provided that the solution was a harmless water solution containing 0.00 ppm cadmium, 0.00 ppm lead and 1.2 ppm oil.

We claim:

1. A method for the treatment of water containing metal ions, oils or suspended solids, which comprises the processes of:

the first process in which the water is electrolyzed in a first electrolytic cell provided with an anode made of aluminum or aluminum alloy while blowing air into said water, so that said metal ions, oils or suspended solids are changed to compounds insoluble in water; then, the second process in which anionic water-soluble high molecular materials are added to the water obtained from said first process, so that said compounds are converted into coagulums which by their structures are apt to ascend to and float on the water surface; and finally the third process in which the water obtained from the second process is electrolyzed in a second electrolytic cell provided with an insoluble anode, so that all said coagulums are substantially caused to ascend to and float on the water surface so as to be separated from the water, thus obtaining harmless and clean water.

2. A method described in claim 1 wherein said anionic water-soluble high molecular materials are selected from the group consisting of sodium polyacrylate, polyacrylamide, and sodium alginate, and the adding ratio of said materials is from 1 to 30 g per 1,000 litre of waste water.

3. A method described in claim 1 wherein electrolysis in said first process is conducted at temperatures from 0° to 50°C and at a current of from 50 to 1,000 A per 1,000 litre of waste water, and electrolysis in said third process is conducted at room temperature and at a current of from 10 to 100 A per 1,000 litre of waste water.

4. A method described in claim 1 wherein said insoluble anode is made of a member selected from the group consisting of graphite, magnetic iron oxide and silicon-containing cast iron.

* * * * *